United States Patent
Iwashita et al.

(10) Patent No.: US 7,506,530 B2
(45) Date of Patent: Mar. 24, 2009

(54) DIE CUSHION MECHANISM, AND DEVICE AND METHOD FOR CONTROLLING THE SAME

(75) Inventors: Yasusuke Iwashita, Fujiyoshida (JP); Tadashi Okita, Fujiyoshida (JP); Hiroyuki Kawamura, Yamanashi (JP); Satoshi Ikai, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 214 days.

(21) Appl. No.: 11/478,633

(22) Filed: Jul. 3, 2006

(65) Prior Publication Data

US 2007/0006632 A1 Jan. 11, 2007

(30) Foreign Application Priority Data

Jul. 5, 2005 (JP) .............................. 2005-196455

(51) Int. Cl.
*B21J 9/18* (2006.01)
(52) U.S. Cl. ............................. 72/454; 72/20.2; 72/21.4
(58) Field of Classification Search .................. 72/20.1, 72/20.2, 21.1, 21.2, 21.4, 37, 351, 453.13, 72/454
See application file for complete search history.

(56) References Cited

U.S. PATENT DOCUMENTS

| 7,049,775 B2 * | 5/2006 | Iwashita et al. | 318/566 |
| 7,069,847 B2 * | 7/2006 | Teraoka | 100/35 |
| 7,287,409 B2 * | 10/2007 | Shiroza et al. | 72/351 |
| 7,293,447 B2 * | 11/2007 | Iwashita et al. | 72/454 |
| 2006/0090656 A1 * | 5/2006 | Iwashita et al. | 100/43 |
| 2006/0288755 A1 * | 12/2006 | Iwashita et al. | 72/351 |

FOREIGN PATENT DOCUMENTS

| EP | 0 556 390 A1 | 8/1993 |
| EP | 0 596 696 A1 | 5/1994 |
| JP | 4-172199 | 6/1992 |
| JP | 10-202327 | 4/1998 |
| JP | 2004-276028 | 10/2004 |
| JP | 2006-212664 | 8/2006 |

* cited by examiner

*Primary Examiner*—Edward Tolan
(74) *Attorney, Agent, or Firm*—Drinker Biddle & Reath LLP (57) ABSTRACT

A device for controlling a die cushion mechanism including a servo-motor as a drive source and producing a force adapted to be applied to a slide in a press machine. The device includes a section for commanding a force to be produced by the die cushion mechanism; a section for detecting a force produced by the die cushion mechanism and applied to the slide; a section for detecting a moving speed of the slide; and a section for executing a force control on the servo-motor. The force controlling section executes force controls in mutually different modes on the servo-motor, through mutually different control loops, one mode being provided for an initial stage defined from an instant when the die cushion mechanism starts producing the force to be applied to the slide until a predetermined subsequent instant, and another mode being provided for a succeeding stage defined after the predetermined subsequent instant, by using at least a slide-speed detected value detected by the slide-speed detecting section. The force controlling section includes a section for preparing a first speed-command value to be commanded to the servo-motor in the initial stage and a second speed-command value, different from the first speed-command value, to be commanded to the servo-motor in the succeeding stage.

19 Claims, 12 Drawing Sheets

DIE CUSHION MECHANISM, AND DEVICE AND METHOD FOR CONTROLLING THE SAME

BACKGROUND OF THE INVENTION

1. Field of the Invention

The present invention relates to a die cushion mechanism. The present invention also relates to a device for controlling a die cushion mechanism. The present invention further relates to a method for controlling a die cushion mechanism.

2. Description of the Related Art

In a press machine (or a forging machine) for performing press working, such as bending, drawing, stamping, etc., it is known that a die cushion mechanism is provided as an auxiliary apparatus for applying, during a pressing operation, a required force (or pressure) to a movable support member (generally referred to as a slide) supporting a first die used for the press working, from the side of a second support member (generally referred to as a bolster) supporting a second die. The die cushion mechanism is usually constructed such that a movable element (generally referred to as a cushion pad) retained under a predetermined pressure is arranged to collide directly or indirectly with the slide (or the first die) moving in a die-closing direction and, after the collision, the cushion pad moves together with the slide while exerting a force (or pressure) to the slide, through the step of die-closing (or press forming) to the step of die-opening. During this procedure, it is possible, for example, to prevent a material to be pressed (or a workpiece) from being wrinkled, by sandwiching the peripheral region of the workpiece surrounding a pressed area between the cushion pad and the slide.

In order to improve the accuracy of the press working using the die cushion mechanism, it is required that the cushion pad stably applies a commanded force (or pressure) to the slide during a period when the cushion pad is moving together with the slide. However, as a conventional die cushion mechanism uses a hydraulic or pneumatic device as the drive source, it has generally been difficult to control the force (or pressure) applied to the slide so as to correspond to a command value in a variable mode, in response to a sudden pressure variation due to external causes, such as the collision with the slide, etc. Therefore, a die cushion mechanism including a servo-motor as a drive source has been recently developed, so as to achieve force control with an excellent response performance.

For example, Japanese Unexamined Patent Publication (Kokai) No. 10-202327 (JP-A-10-202327) discloses a die cushion mechanism in which a cushion pad arranged beneath a slide of a press machine is vertically moved up and down by a servo-motor so as to correspond to the vertical motion of the slide. During a period when the slide is moved downward (i.e., during the pressing operation), and before the slide applies a collision force to the cushion pad, the servo-motor acts in accordance with a position control based on a position command for the cushion pad, so as to locate the cushion pad at a predetermined waiting position. Also, after the slide applies a collision force to the cushion pad, the servo-motor acts in accordance with a force control based on a force command, previously determined to correspond to the position of the cushion pad, so as to move the cushion pad together with the slide and simultaneously adjust the force (or pressure) applied to the slide from the cushion pad. In this connection, the detection of collision and pressure is accomplished by detecting a load applied to the output shaft of the servo-motor through the cushion pad.

As described above, in the conventional die cushion mechanism using a servo-motor drive, the force (or pressure) applied to the slide from the cushion pad is suitably adjusted by changing the control scheme of the servo-motor from the position control to the force control at an instant when the slide exerts a collision force on the cushion pad. However, it is difficult, with only such a simple change of the control scheme, to properly and quickly control the force (or pressure) of the cushion pad in response to a significant pressure fluctuation due to the impact of collision.

For example, in the case of the force control, the speed or torque of the servo-motor is ultimately controlled, so that a speed command to the servo-motor is always required, due to a speed feedback from the servo-motor that arises during the execution of the force control (i.e., during the movement of the cushion pad). Therefore, a compensator such as an integrator needs to be used to hold the speed command. However, the response of an integrator is generally not fast enough, and there may be a case that it is difficult to hold a proper speed command following a rapid fluctuation of the force at the time of collision. In this case, the overshoot of the force immediately after collision may become excessively large.

Further, at the instant when the slide exerts the collision force onto the cushion pad (i.e., when the force control is started), or at an instant when the output torque of the servo-motor fluctuates due to any external causes during the execution of the force control, a time interval required for allowing a force detecting section (in JP-A-10-202327, a load detecting section for the servo-motor) to detect a force produced between the slide and the cushion pad (i.e., dead time) is typically long. Therefore, it is difficult to improve a response in a feed-back loop, for the force control, through which a force detected value is fed back from the force detecting section.

SUMMARY OF THE INVENTION

It is an object of the present invention to provide a control device for a die cushion mechanism including a servo-motor as a drive source and producing a force adapted to be applied to a slide in a press machine, which is capable of executing a force control for allowing the die cushion mechanism to properly produce a required force with a superior performance in response.

It is another object of the present invention to provide a die cushion mechanism adapted to be incorporated in a press machine, which is capable of properly producing a required force with a superior response performance for control.

It is yet another object of the present invention to provide a control method for a die cushion mechanism including a servo-motor as a drive source and producing a force adapted to be applied to a slide in a press machine, which is capable of executing a force control for allowing the die cushion mechanism to properly produce a required force with a superior response performance.

In order to accomplish the above objects, the present invention provides a device for controlling a die cushion mechanism including a servo-motor as a drive source, and producing a force adapted to be applied to a slide in a press machine, comprising a force commanding section for commanding a force to be produced by the die cushion mechanism; a force detecting section for detecting a force produced by the die cushion mechanism and applied to the slide; a slide-speed detecting section for detecting a moving speed of the slide; and a force controlling section for executing force controls in mutually different modes on the servo-motor, through mutually different control loops, one mode being provided for an initial stage defined from an instant when the die cushion mechanism starts producing the force to be applied to the slide until a predetermined subsequent instant, and another mode being provided for a succeeding stage defined after the predetermined subsequent instant, by using at least a slide-speed detected value detected by the slide-speed detecting section.

In the above-described control device, the force controlling section may comprise a speed-command preparing section for preparing a first speed-command value to be commanded to the servo-motor in the initial stage and a second speed-command value, different from the first speed-command value, to be commanded to the servo-motor in the succeeding stage.

In this arrangement, the speed-command preparing section may use, in the initial stage, exclusively the slide-speed detected value, to prepare the first speed-command value, and use, in the succeeding stage, a force command value commanded by the force commanding section and a force detected value detected by the force detecting section in addition to the slide-speed detected value, to prepare the second speed-command value.

Alternatively, the speed-command preparing section may use, in the initial stage, the slide-speed detected value, with a force deviation, given by a force command value commanded by the force commanding section and a force detected value detected by the force detecting section, being set to zero, to prepare the first speed-command value, and use, in the succeeding stage, an actual value of the force deviation and the slide-speed detected value, to prepare the second speed-command value.

Alternatively, the speed-command preparing section may use, in the initial stage, the slide-speed detected value, with a force gain as multiplied by a force deviation, given by a force command value commanded by the force commanding section and a force detected value detected by the force detecting section, being set to zero, to prepare the first speed-command value, and use, in the succeeding stage, the force deviation and the slide-speed detected value, with the force gain being set to a predetermined value other than zero, to prepare the second speed-command value.

The above-described control device may further comprise a force estimating section for estimating a force produced by the die cushion mechanism and applied to the slide. In this arrangement, the speed-command preparing section may use, in the initial stage, a force command value commanded by the force commanding section and a force estimated value estimated by the force estimating section in addition to the slide-speed detected value, to prepare the first speed-command value, and use, in the succeeding stage, a force command value commanded by the force commanding section and a force detected value detected by the force detecting section in addition to the slide-speed detected value, to prepare the second speed-command value.

The present invention also provides a die cushion mechanism incorporated into a press machine including a slide, comprising a cushion pad movable correspondingly to a motion of the slide; a servo-motor for driving the cushion pad; and a control device, as described above, for controlling the servo-motor and producing a correlative pressure between the cushion pad and the slide.

The present invention further provides a method for controlling a die cushion mechanism including a servo-motor as a drive source and producing a force adapted to be applied to a slide in a press machine, comprising the steps of determining a force command value regarding a force to be produced by the die cushion mechanism; determining a force detected value regarding a force produced by the die cushion mechanism and applied to the slide; determining a moving-speed detected value regarding a moving speed of the slide; and executing force controls in mutually different modes on the servo-motor, through mutually different control loops, one mode being provided for an initial stage defined from an instant when the die cushion mechanism starts producing the force to be applied to the slide until a predetermined subsequent instant, and another mode being provided for a succeeding stage defined after the predetermined subsequent instant, by using at least the moving-speed detected value regarding the moving speed of the slide.

In the above-described control method, the step of executing force controls comprises the step of preparing a first speed-command value to be commanded to the servo-motor in the initial stage and the step of preparing a second speed-command value, different from the first speed-command value, to be commanded to the servo-motor in the succeeding stage.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

The embodiments of the present invention are described below in detail, with reference to the accompanying drawings. In the drawings, the same or similar components are denoted by common reference numerals.

Figure 1:
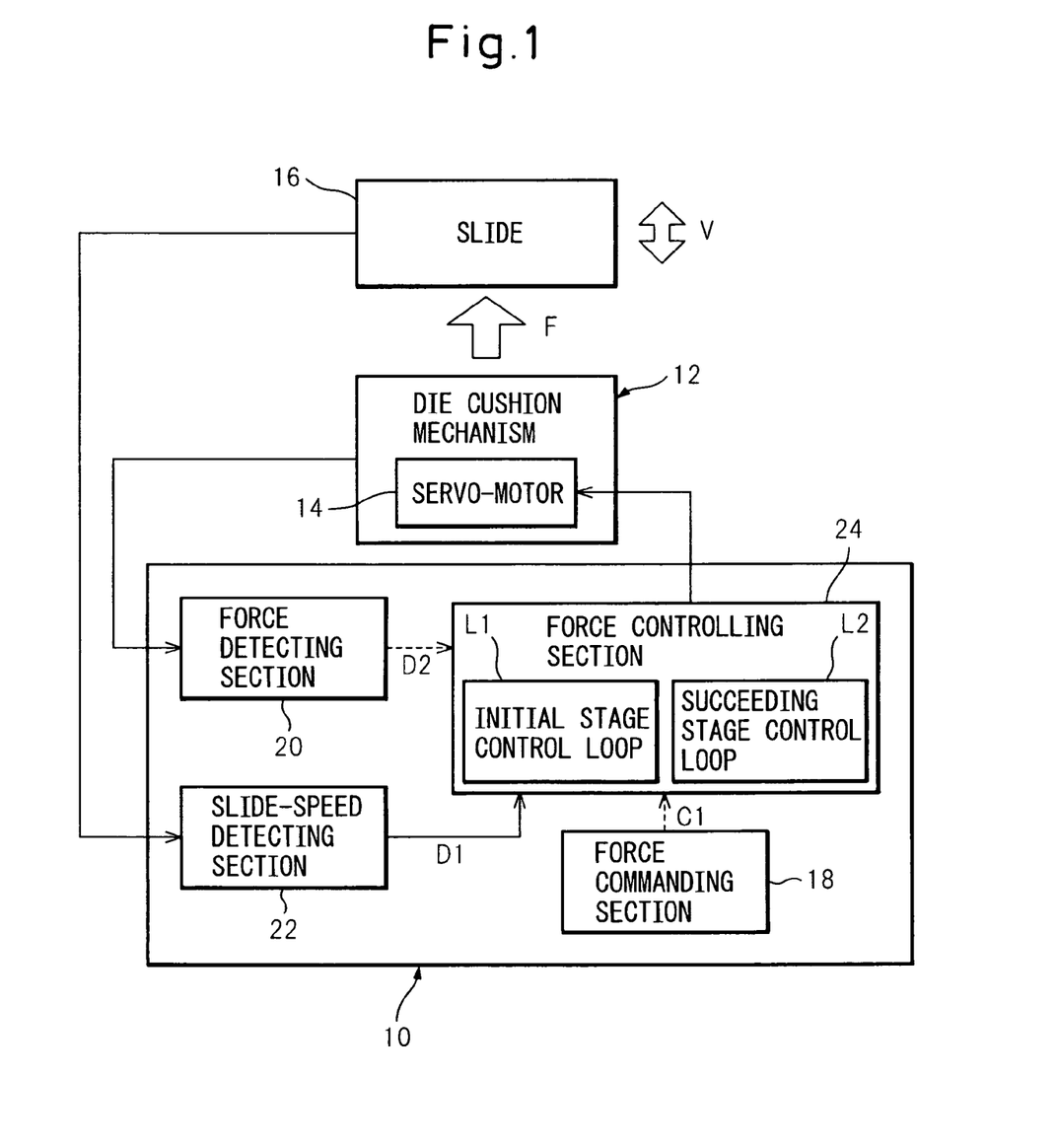
FIG. 1 is a functional block diagram showing a basic configuration of a control device for a die cushion mechanism, according to the present invention.
Figure 2:
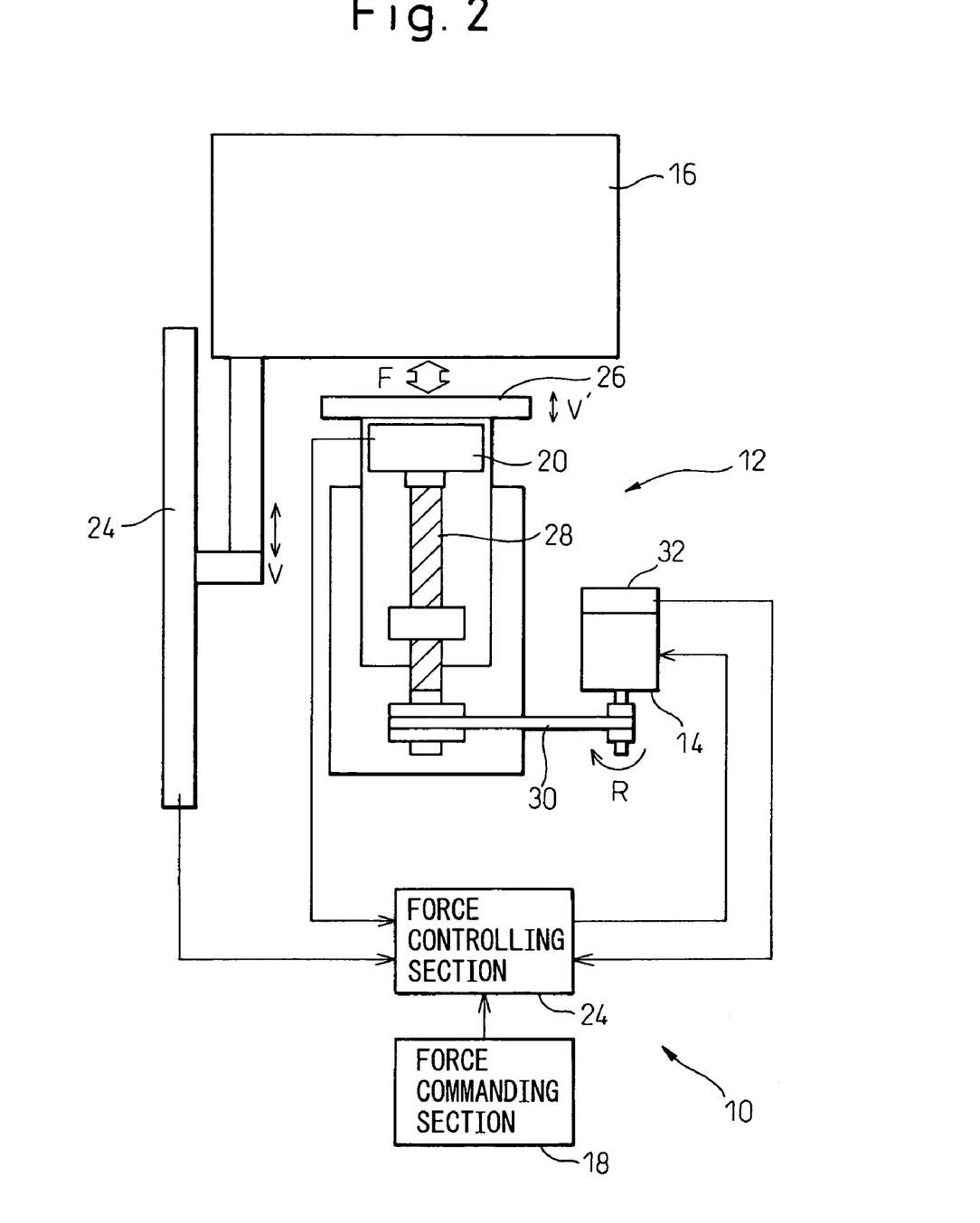
FIG. 2 is an illustration schematically showing a die cushion mechanism according to an embodiment of the present invention, which includes the control device of FIG. 1.

Referring to the drawings, FIG. 1 is a functional block diagram showing a basic configuration of a control device 10 according to the present invention, and FIG. 2 is a schematic illustration showing a basic configuration of a die cushion mechanism 12 according to an embodiment of the present invention, which includes the control device 10.

As shown in FIGS. 1 and 2, the control device 10, according to the present invention, has a configuration for controlling the die cushion mechanism 12 including a servo-motor 14 as a drive source and producing a force F adapted to be applied to a slide 16 in a press machine (or a forging machine). The control device 10 includes a force commanding section 18 for commanding a force F to be produced by the die cushion mechanism 12; a force detecting section 20 for detecting a force F produced by the die cushion mechanism 12 and applied to the slide 16; a slide-speed detecting section 22 for detecting a moving speed V of the slide 16; and a force controlling section 24 for executing a force control on the servo-motor 14. The force controlling section 24 is configured to execute force controls in mutually different modes on the servo-motor 14, through mutually different control loops L1, L2, one mode being provided for an initial stage defined from an instant when the die cushion mechanism 12 starts producing the force F to be applied to the slide 16 until a predetermined subsequent instant, and another mode being provided for a succeeding stage defined after the predetermined subsequent instant, by using at least a slide-speed detected value D1 detected by the slide-speed detecting section 22.

On the other hand, the die cushion mechanism 12, according to an embodiment of the present invention, is configured to be incorporated into the press machine. The die cushion mechanism 12 includes a cushion pad 26 movable correspondingly to a motion of the slide 16; the servo-motor 14 for driving the cushion pad 26; and the control device 10 for controlling the servo-motor 14 and producing a correlative pressure (i.e., the force F) between the cushion pad 26 and the slide 16. The slide 16 supports a first die (not shown) used for a press working, and moves at a speed V required for a press working in a direction toward or away from a second die (not shown) supported on a not-shown bolster. The cushion pad 26 is arranged in association with the second die, and is connected through a ball screw unit 28 and a belt/pulley unit 30 to an output shaft of the servo-motor 14. The slide 16 (or the first die) collides directly or indirectly against the cushion pad 26 waiting at a predetermined position, during a period when the slide 16 moves in a die-closing direction. Usually, through the step of die-closing (or press forming) to the step of die-opening, the cushion pad 26 moves together with the slide 16, at a speed V' depending on an operating speed R of the servo-motor 14, while applying the required force (pressure) F to the slide 16.

In the configuration described above, for the purpose of forming a speed control loop for the servo-motor 14, the control device 10 may further include a motor-speed detecting section 32 for detecting the operating speed R of the servo-motor 14 in this connection, the force detecting section 20 may include a known force (or pressure) sensor, the slide-speed detecting section 22 may include a known linear scale, and the motor-speed detecting section 32 may include a known encoder, respectively.

In the control device 10 configured as described above, the force controls in mutually different modes are executed on the servo-motor 14, such that one mode is executed in the initial stage defined from the first instant when the die cushion mechanism 12 starts producing the force applied to the slide 16 (i.e., an instant when the slide 16 collides with the cushion pad 26) until the predetermined second instant subsequent to the first instant, and the other mode is executed for the succeeding stage defined after the predetermined second instant. Therefore, it is possible to execute, in the initial stage in which the rate of change in the force F produced between the slide 16 and the cushion pad 26 is relatively large, the force control through one control loop L1 capable of shortening a time interval (i.e., dead time) required for allowing the force detecting section 20 to detect the force F, in place of a typical or usual force control using a force feed-back. As a result, it is possible to improve the response of the force control in the initial stage.

A speed control loop may be adopted, for example, as the control loop L1 ensuring the superior response. However, a speed control does not directly control the force F produced by the die cushion mechanism 12, and thus tends to have low accuracy. Therefore, in the succeeding stage in which the rate of change in the force F is insignificant, the force control is executed through the typical or usual force control loop L2, so as to make it possible to ensure the high accuracy of the force control. In this arrangement, the typical force control loop L2 may cause a long dead time, but does not affect the response in the force control because the rate of change in the force F is insignificant in the succeeding stage.

Further, in the control device 10, the servo-motor 14 operates under the force control using at least the slide-speed detected value D1 after the force F is produced in the die cushion mechanism 12 and, therefore, it is possible to solve the conventional problems such that the overshoot of the force resulting from the speed feedback value of the servo-motor 14 is likely to increase immediately after collision between the slide 16 and the cushion pad 26. In other words, by a configuration in which the force controlling section 24 possesses information (especially, speed information) on both the slide 16 and the cushion pad 26, cooperatively operating during a press working, it is possible to improve compliance in the cooperative operation. As a result, according to the control device 10, it is possible to make the die cushion mechanism 12 properly produce the force F required for the press working with a superior performance in response.

In this connection, such a characteristic operative effect obtained by the control apparatus 10 is also effective in a configuration wherein the control mode of the servo-motor 14 is changed from the position control to the force control at an instant when the slide 16 collides against the cushion pad 28, as described in JP-A-10-202327, so as to solve the problems of the force control after changing the control mode. However, the present invention is not limited to this application, and the particular operative effect of the control apparatus 10 may also be obtained in a configuration wherein the servo-motor 14 is operated only by the force control and not by the position control, such as a conventional die cushion mechanism using a hydraulic or pneumatic device as a drive source.

The above configuration of the control device 10 may also be described as a control method such that the control method includes the steps of determining a force command value C1 regarding a force F to be produced by the die cushion mechanism 12; determining a force detected value D2 regarding a force F produced by the die cushion mechanism 12 and applied to the slide 16; determining a moving-speed detected value D1 regarding a moving speed V of the slide 16; and executing force controls in mutually different modes on the servo-motor 14, through mutually different control loops L1, L2, one mode being provided for the above-described initial stage and another mode being provided for the above-described succeeding stage, by using at least the moving-speed detected value D1 regarding the moving speed V of the slide 16. The above-described particular operative effect can be obtained by executing this control method.

More concrete configurations, in which the force controls in mutually different modes are executed respectively for the initial and succeeding stages showing the mutually different rates of change in the force F, will be described below in connection with several preferred embodiments of the present invention. Each of these embodiments has the basic construction of the control device 10 as described above, so that corresponding components are denoted by common reference numerals or symbols and the explanations thereof are not repeated. Further, each embodiment includes the motor-speed detecting section 32 for detecting the operating speed R of the servo-motor 14.

Figure 3:
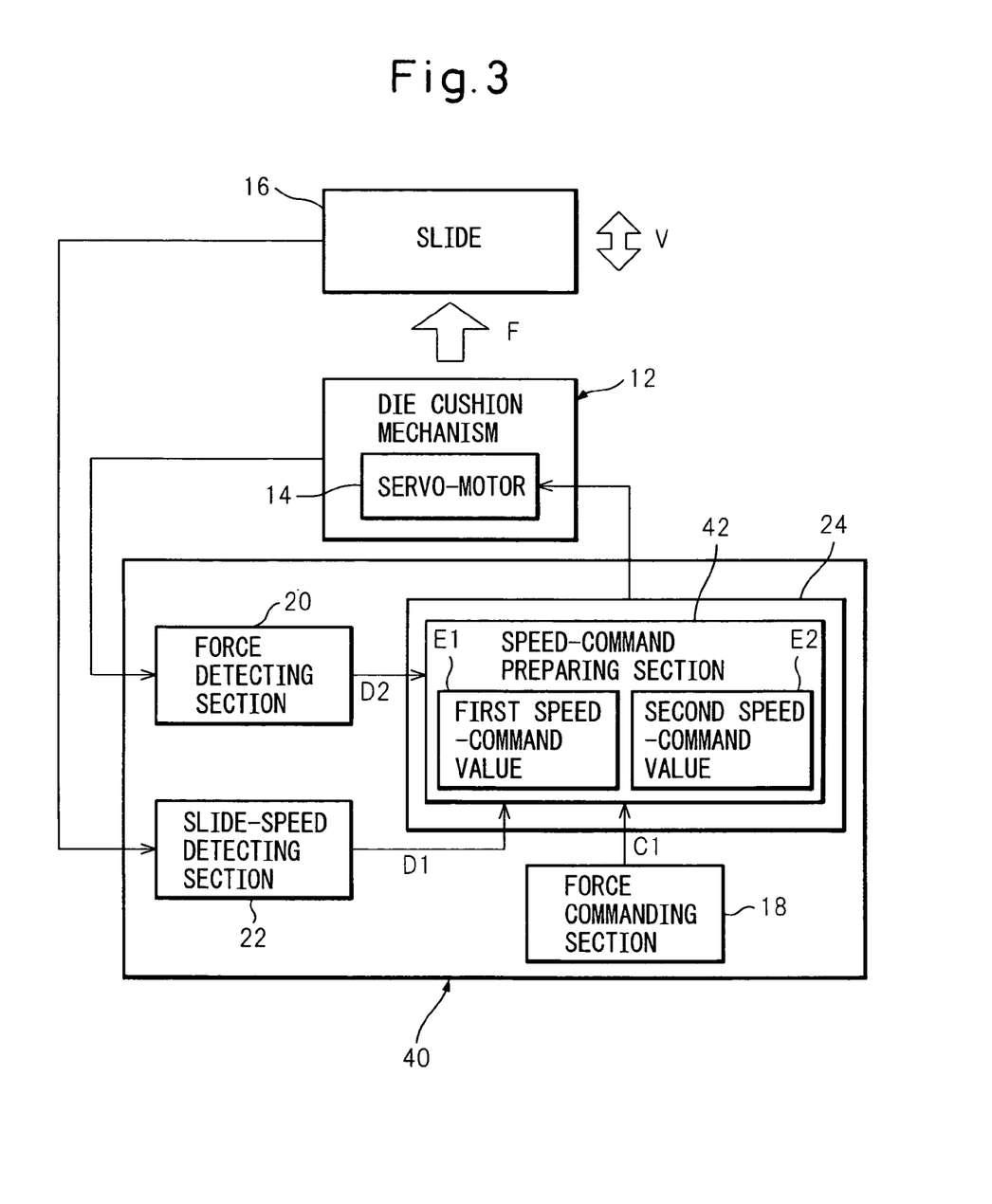
FIG. 3 is a functional block diagram showing a control device according to a first embodiment of the present invention.

In a control device 40 according to a first embodiment of the present invention, as shown in FIG. 3, the force controlling section 24 includes a speed-command preparing section 42 for preparing a first speed-command value E1 to be commanded to the servo-motor 14 in the initial stage and a second speed-command value E2 to be commanded to the servo-motor 14 in the succeeding stage. In this arrangement, the first and second speed-command values E1 and E2 are different from each other. According to this configuration, the first speed-command value E1 is used, in the initial stage, to control the speed or torque of the servo-motor 14 through the control loop L1, and the second speed-command value E2 is used, in the succeeding stage, to control the speed or torque of the servo-motor 14 through the control loop L2.

The purpose of control in the control device 40 is such that the force command value C1 commanded by the force commanding section 18 and the force detected value D2 detected by the force detecting section 20 are made equal to each other (i.e., a force deviation is zero), and also that the slide-speed detected value D1 detected by the slide-speed detecting section 22 and a detected value D3 of the operating speed R of the servo-motor 14 (hereinafter referred to as a motor-speed detected value D3) detected by the motor-speed detecting section 32 (FIG. 2) are made equal to each other (i.e., a speed deviation is zero). In this connection, as described above, a dead time from an instant when the force F is produced until an instant when the force detected value D2 is output is relatively long, whereas a dead time from an instant when a speed command is input to the servo-motor 14 until an instant when the motor-speed detected value D3 is output is relatively short and, therefore, the response in the speed control loop of the servo-motor 14 is higher than that in the force control loop.

Therefore, in the initial stage in which the rate of change in the force F is significant (for a predetermined time period (e.g., about 50 ms to 100 ms) immediately after collision), the servo-motor 14 is controlled by using the first speed-command value E1 through the speed control loop L1, showing lower accuracy but ensuring a higher response, so as to allow the motor-speed detected value D3 to converge into the slide-speed detected value D1. On the other hand, in the succeeding stage in which the rate of change in the force F is insignificant, the servo-motor 14 is controlled by using the second speed-command value E2 through the force control loop L2, showing a lower response but ensuring higher accuracy, so as to allow the force detected value D2 to converge into the force command value C1. According to the above control technique, the above-described two purposes of control can be achieved quickly and accurately.

Figure 4:
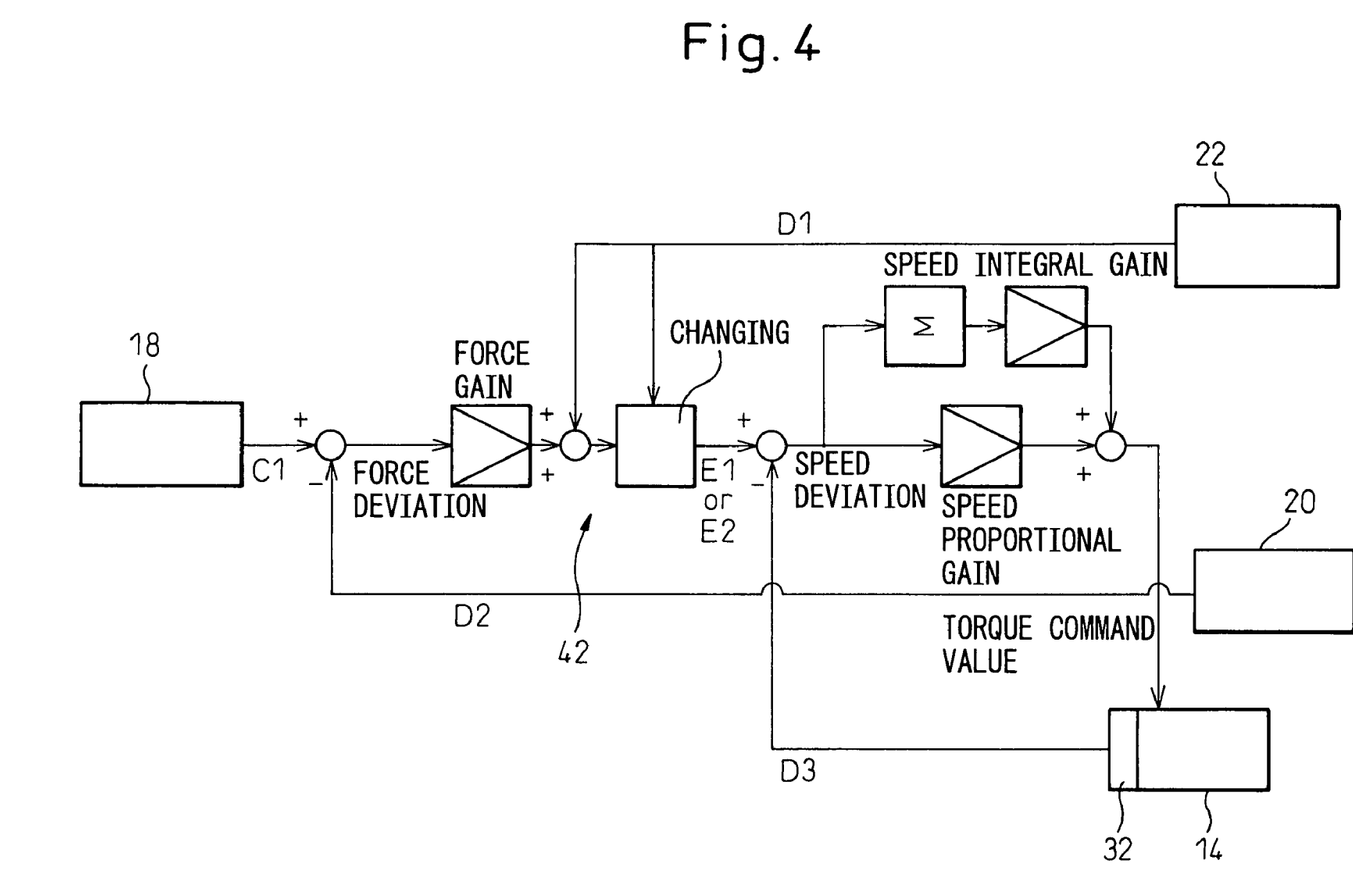
FIG. 4 is a block diagram showing a first control system implementing the control device of FIG. 3.
Figure 6:
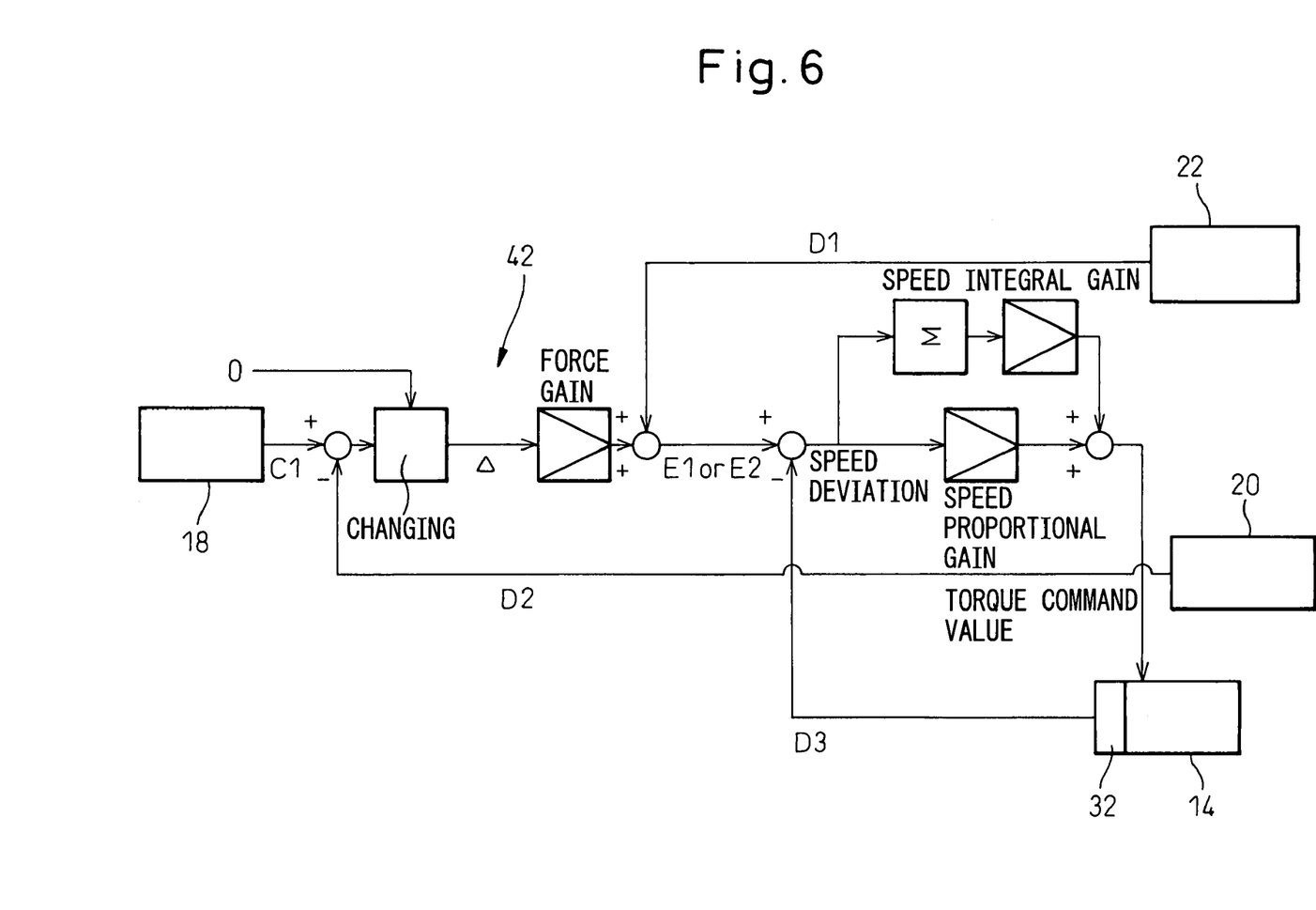
FIG. 6 is a block diagram showing a second control system implementing the control device of FIG. 3.
Figure 8:
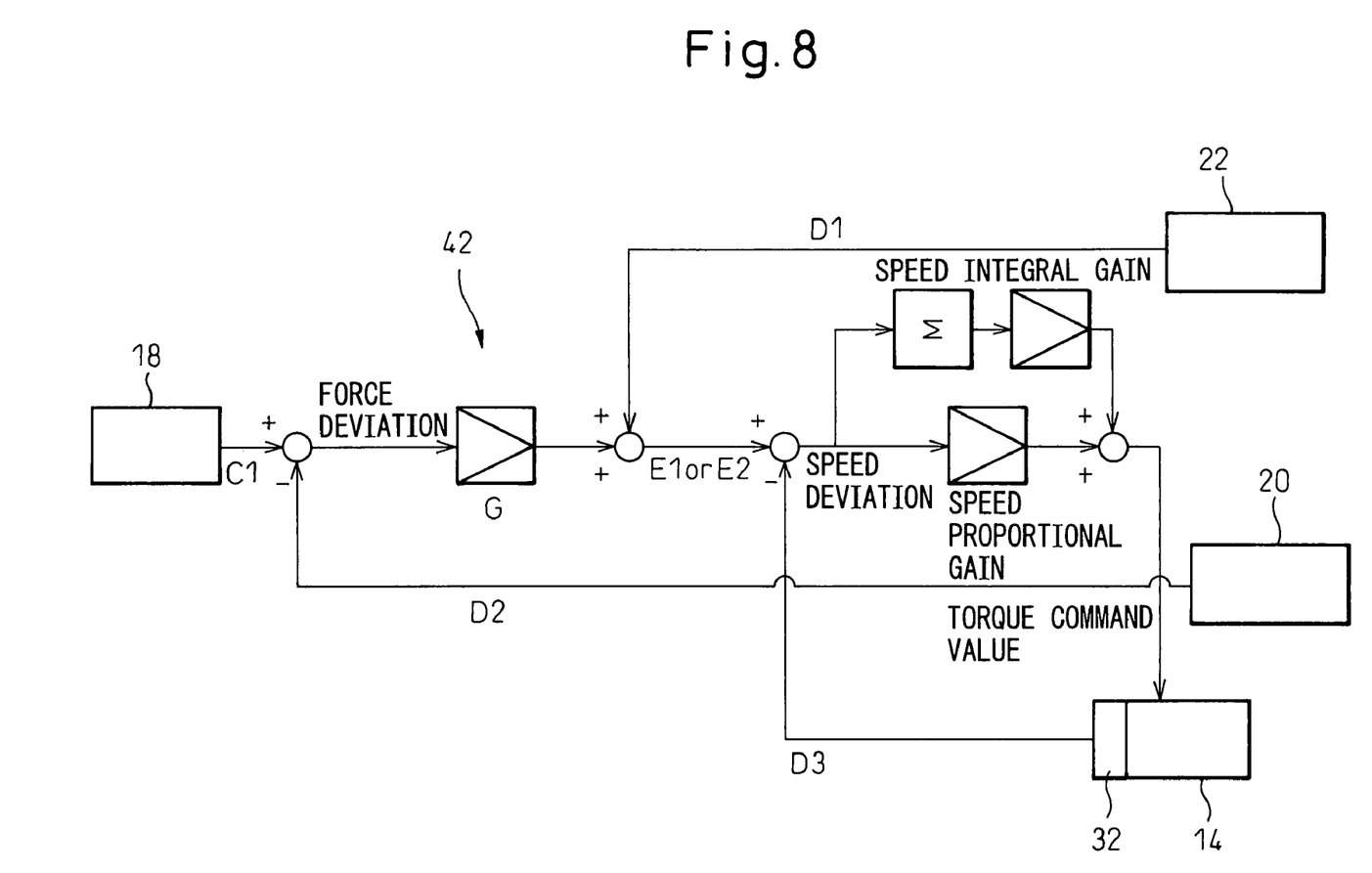
FIG. 8 is a block diagram showing a third control system implementing the control device of FIG. 3.

The configuration of the control device 40 described above can be implemented as three types of control systems, respectively shown by block diagrams in FIGS. 4, 6 and 8. In the control system shown in FIG. 4, the speed-command preparing section 42 uses, in the initial stage, exclusively the slide-speed detected value D1 detected by the slide-speed detecting section 22, to prepare the first speed-command value E1, and uses, in the succeeding stage, the force command value C1 commanded by the force commanding section 18 and the force detected value D2 detected by the force detecting section 20 in addition to the slide-speed detected value D1, to prepare the second speed-command value E2.

Figure 5:
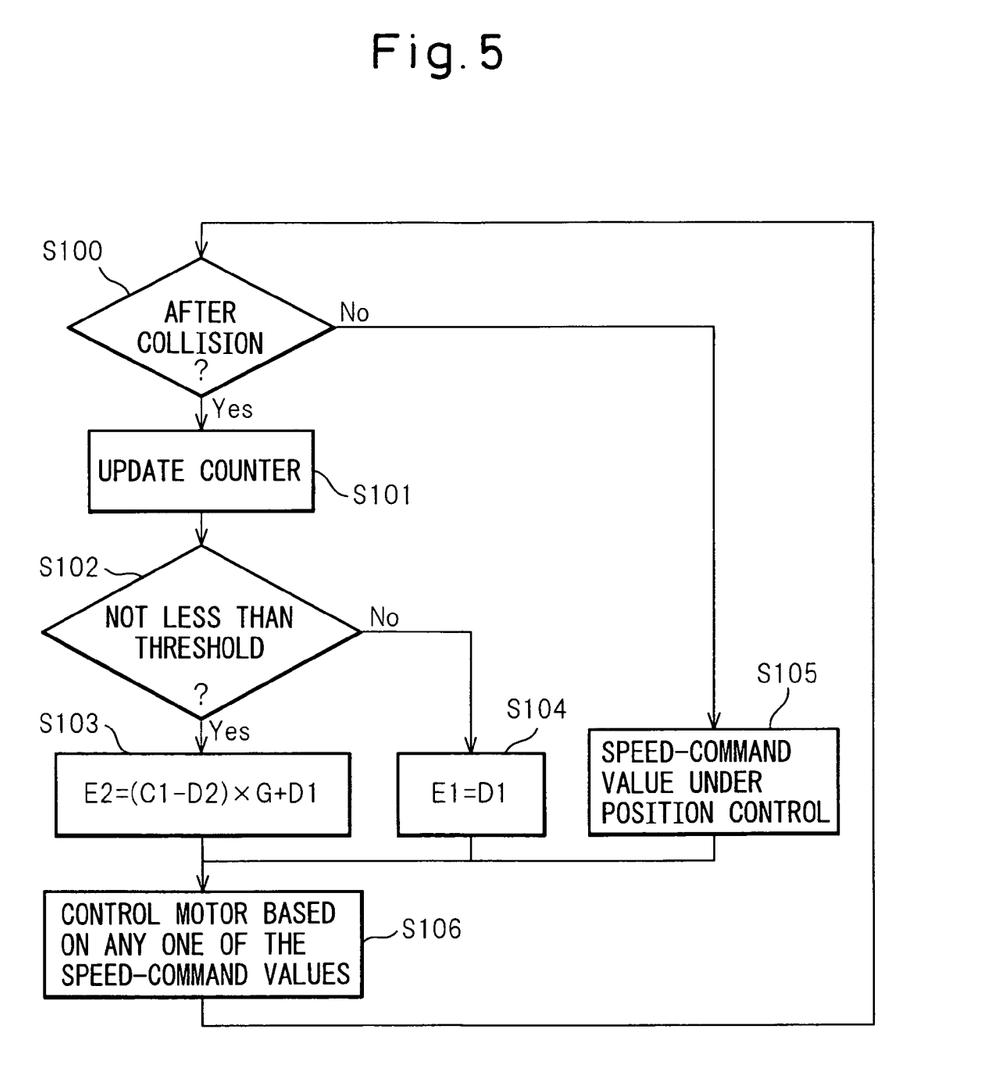
FIG. 5 is a control flow chart of the control system of FIG. 4.

The control system of FIG. 4 will be described in more detail, with reference to a force control flow shown in FIG. 5. First, it is judged, in step S100, whether the die cushion mechanism 12 produces the force F to be applied to the slide 16 (i.e., whether the slide 16 has collided with the die cushion mechanism 12). If the collision has already occurred, a counter (or a timer) is updated in step S101, and it is then judged, in step S102, whether the counter is not less than a threshold (i.e., whether the process is either in the initial stage or in the succeeding stage). If the counter is not less than the threshold (i.e., the process is in the succeeding stage), the second speed-command value E2 is calculated, in step S103, by using the force command value C1, the force detected value D2 and the slide-speed detected value D1, according to the following formula (1), wherein G represents a force gain:

$$E2=(C1-D2)\times G+D1 \quad (1)$$

On the other hand, if it is determined, in step S102, that the counter is less than the threshold (i.e., the process is in the initial stage), the first speed-command value E1 is calculated, in step S104, by exclusively using the slide-speed detected value D1 (i.e., E1=D1). Further, if it is determined, in step S100, that the slide 16 has not yet collided with the die cushion mechanism 12, the speed-command value under the position control is adopted, in step S105, as the speed-command value for the servo-motor 14. Then, in step S106, the servo-motor 14 is controlled, based on any one of the speed-command values determined so as to meet the respective situations described above.

In the other control system shown in FIG. 6, the speed-command preparing section 42 uses, in the initial stage, the slide-speed detected value D1 detected by the slide-speed detecting section 22, with a force deviation Δ, given by the force command value C1 commanded by the force commanding section 18 and the force detected value D2 detected by the force detecting section 20, being forcibly set to zero, to prepare the first speed-command value E1, and uses, in the succeeding stage, an actual value of the force deviation Δ and the slide-speed detected value D1, to prepare the second speed-command value E2.

The control system of FIG. 6 will be described in more detail, with reference to a force control flow shown in FIG. 7. First, it is judged, in step S110, whether the die cushion mechanism 12 produces the force F to be applied to the slide 16 (i.e., whether the slide 16 has collided with the die cushion mechanism 12). If the collision has already occurred, a counter (or a timer) is updated in step S111, and it is then judged, in step S112, whether the counter is not less than a threshold (i.e., whether the process is either in the initial stage or in the succeeding stage). If the counter is not less than the threshold (i.e., the process is in the succeeding stage), the force deviation Δ is calculated, in step S113 (i.e., Δ=C1−D2).

On the other hand, if it is determined, in step S112, that the counter is less than the threshold (i.e., the process is in the initial stage), the force deviation Δ is set to zero, in step S114 (i.e., Δ=0). Then, the first speed-command value E1 and the second speed-command value E2 (generally referred to as a speed-command value E) are calculated, in step S115, by using the force deviation Δ and the slide-speed detected value D1, according to the following formula (2), wherein G represents a force gain;

$$E=\Delta\times G+D1 \quad (2)$$

Further, if it is determined, in step S110, that the slide 16 has not yet collided with the die cushion mechanism 12, the speed-command value under the position control is adopted, in step S116, as the speed-command value for the servo-motor 14. Then, in step S117, the servo-motor 14 is controlled, based on any one of the speed-command values determined so as to meet the respective situations described above.

In the further control system shown in FIG. 8, the speed-command preparing section 42 uses, in the initial stage, the slide-speed detected value D1 detected by the slide-speed detecting section 22, with a force gain G as multiplied by a force deviation Δ, given by the force command value C1 commanded by the force commanding section 18 and the force detected value D2 detected by the force detecting section 20, being set to zero, to prepare the first speed-command value E1, and uses, in the succeeding stage, the force deviation Δ and the slide-speed detected value D1 with the force gain G being set to a predetermined value other than zero, to prepare the second speed-command value E2.

The control system of FIG. 8 will be described in more detail, with reference to a force control flow shown in FIG. 9. First, it is judged, in step S120, whether the die cushion mechanism 12 produces the force F to be applied to the slide 16 (i.e., whether the slide 16 has collided with the die cushion mechanism 12). If the collision has already occurred, a counter (or a timer) is updated in step S121, and it is then judged, in step S122, whether the counter is not less than a threshold (i.e., whether the process is either in the initial stage or in the succeeding stage). If the counter is not less than the threshold (i.e., the process is in the succeeding stage), the force gain G is set to the predetermined value other than zero, in step S123 (i.e., G=given value≠0).

On the other hand, if it is determined, in step S122, that the counter is less than the threshold (i.e., the process is in the initial stage), the force gain G is set to zero, in step S124 (i.e., G=0). Then, the first speed-command value E1 and the second speed-command value E2 (generally referred to as a speed-command value E) are calculated, in step S125, by using the force command value C1, the force detected value D2 and the slide-speed detected value D1, according to the following formula (3):

$$E=(C1-D2)\times G+D1 \quad (3)$$

Further, if it is determined, in step S120, that the slide 16 has not yet collided with the die cushion mechanism 12, the speed-command value under the position control is adopted, in step S126, as the speed-command value for the servo-motor 14. Then, in step S127, the servo-motor 14 is controlled, based on any one of the speed-command values determined so as to meet the respective situations described above.

In each of the control systems described above, a proportional gain is used as the force gain, and the speed-command preparing section 42 calculates the second speed-command value E2 by adding the slide-speed detected value D1 and a product of the force deviation multiplied by the proportional gain. Thus, the configuration of the control device 40 is simplified. Alternatively, the speed-command preparing section 42 may calculate the second speed-command value E2 by summing up the slide-speed detected value D1, a product of the force deviation multiplied by a first force gain (i.e., a proportional gain), and a product of an integral value of the force deviation multiplied by a second force gain (i.e., an integral or storage gain). Thus, the accuracy of the second speed-command value E2 is improved.

Figure 7:
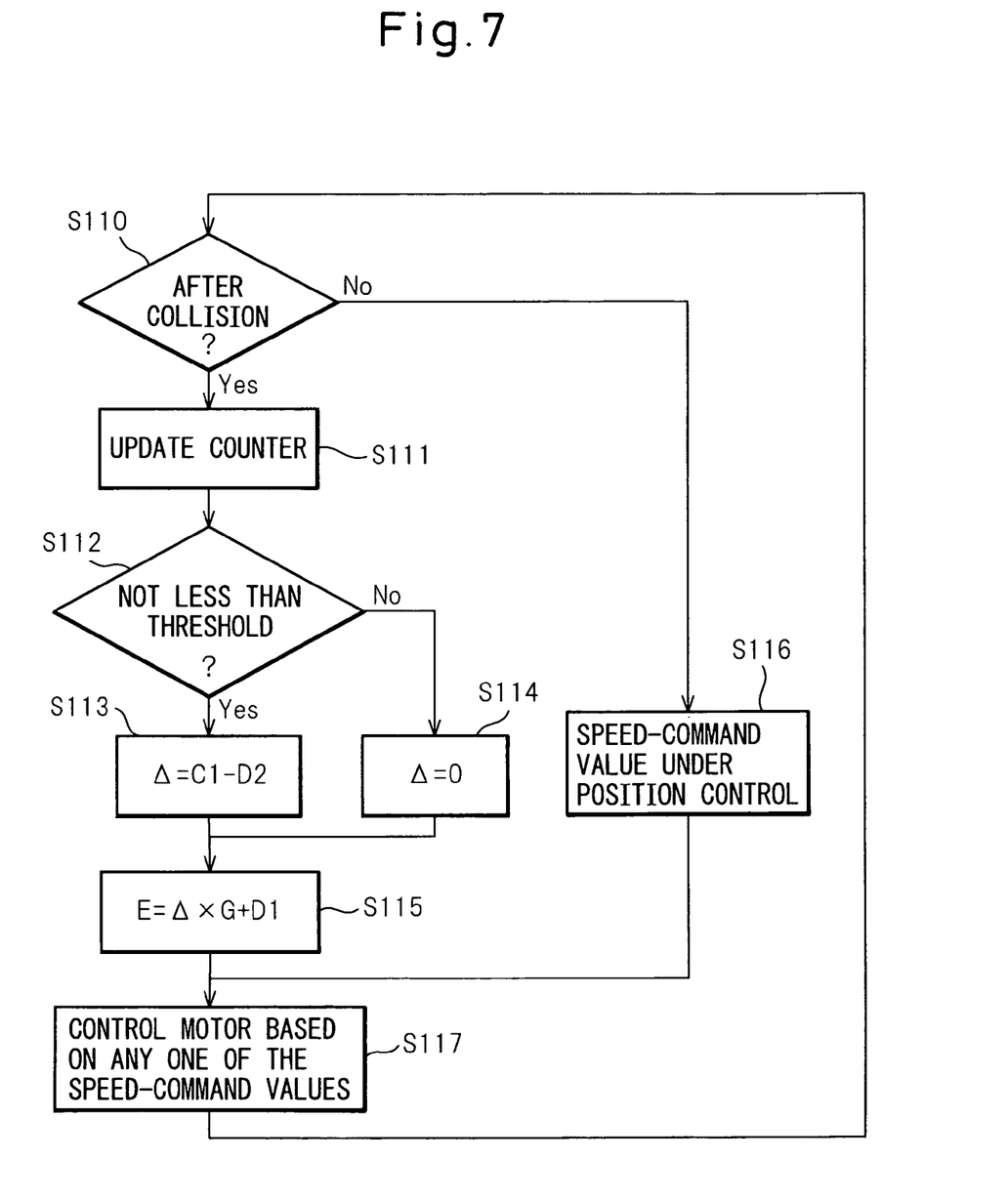
FIG. 7 is a control flow chart of the control system of FIG. 6.

In the above modification, for example, the formula (2) in step S115 of FIG. 7 is modified into the following formula (2'):

$$E=\Delta\times G1+\int \Delta\times G2+D1 \quad (2')$$

Figure 9:
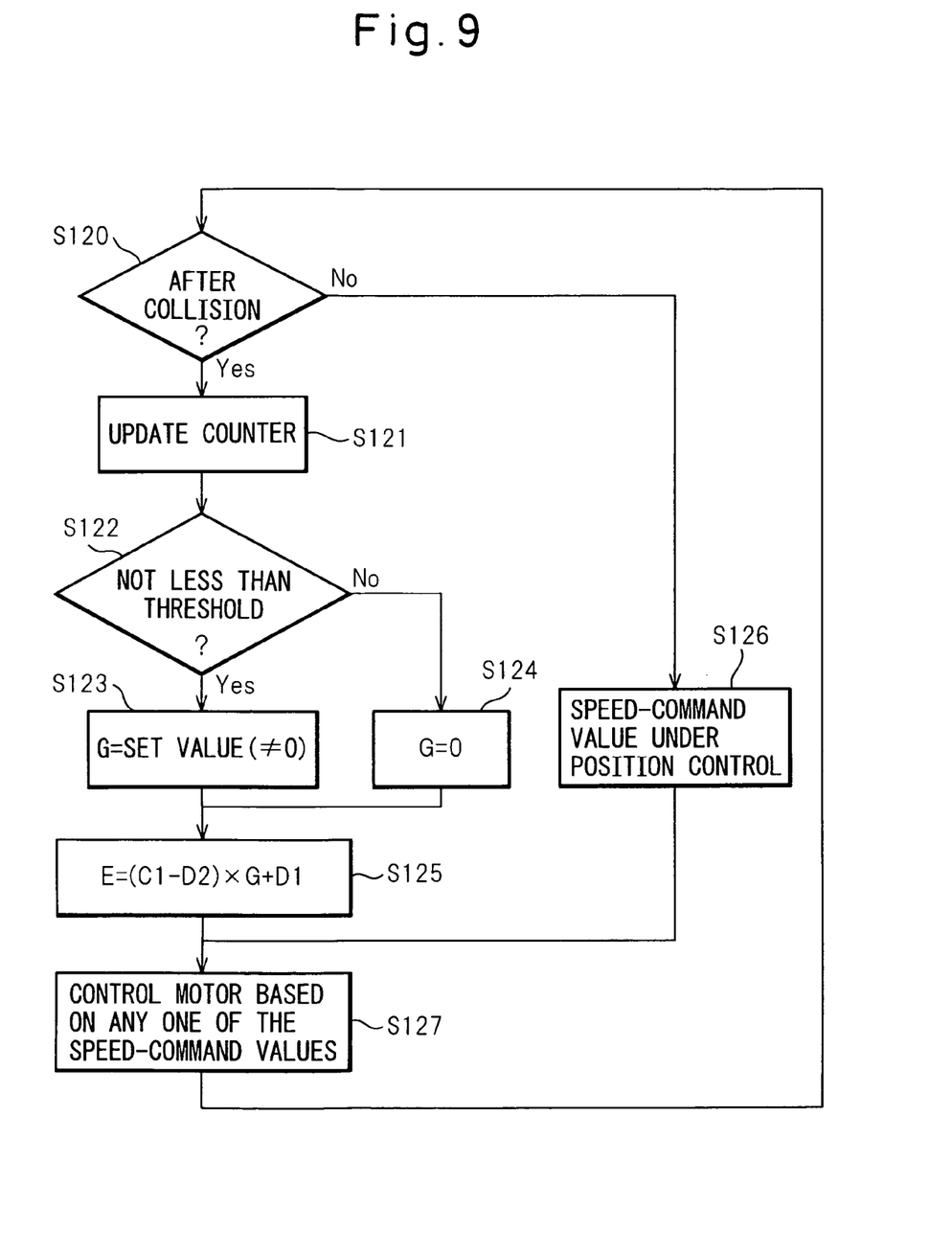
FIG. 9 is a control flow chart of the control system of FIG. 8.

Further, the formula (3) in step S125 of FIG. 9 is modified into the following formula (3'):

$$E=(C1-D2)\times G1+\int (C1-D2)\times G2+D1 \quad (3')$$

Note that, in the formulae (2') and (3'), G1 is a first force gain (or a proportional gain), and G2 is a second force gain (or an integral or storage gain).

Still further, the task in step S124 of FIG. 9 is modified into the task such that at least one of the first force gain G1 and the second force gain G2 is set to zero.

Figure 10:
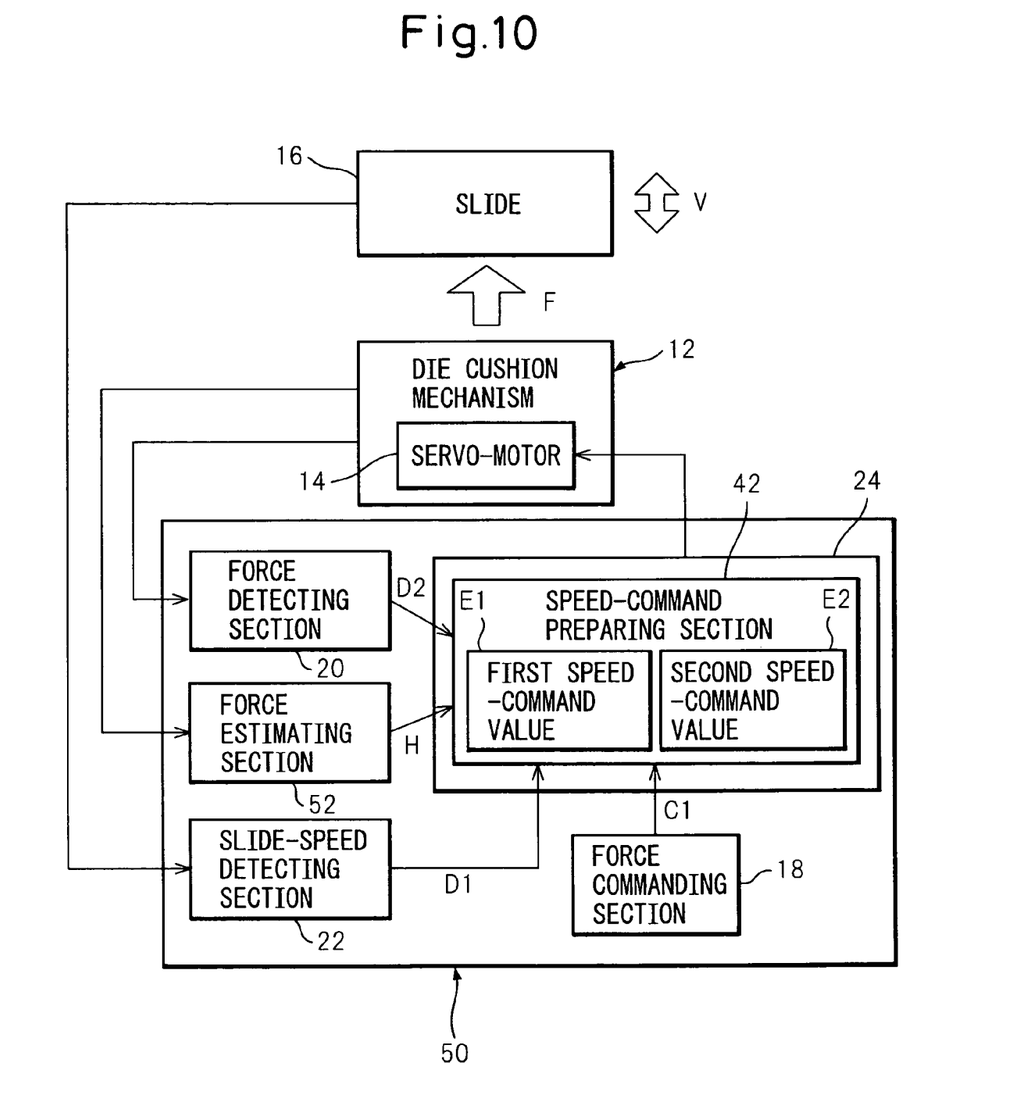
FIG. 10 is a functional block diagram showing a control device according to a second embodiment of the present invention.

Next, a control device 50, according to a second embodiment of the present invention, will be described with reference to FIG. 10. The control device 50 further includes a force estimating section 52 for estimating a force produced by the die cushion mechanism 12 and applied to the slide 16, in addition to the configuration of the control device 40 of the first embodiment. The speed-command preparing section 42 uses, in the initial stage, the force command value C1 commanded by the force commanding section 18 and a force estimated value H estimated by the force estimating section 52 in addition to the slide-speed detected value D1 detected by the slide-speed detecting section 22, to prepare the first speed-command value E1, and uses, in the succeeding stage, the force command value C1 commanded by the force commanding section 18 and the force detected value D2 detected by the force detecting section 20 in addition to the slide-speed detected value D1 detected by the slide-speed detecting section 22, to prepare the second speed-command value E2.

In the control device 40 according to the first embodiment described above, the servo-motor 14 is controlled through, in the initial stage, the speed control loop L1 that ensures higher response and allows the motor-speed detected value D3 to converge into the slide-speed detected value D1, whereas, in the control device 50, the servo-motor 14 is controlled through, also in the initial stage, a second force control loop L1 that uses the force estimated value H estimated by the force estimating section 52. In the succeeding stage, similarly to the control device 40 described above, the control device 50 executes a control operation so as to allow the force detected value D2 to converge into the force command value C1.

In this connection, assuming that the die cushion mechanism 12 includes an elastic element, it may be defined as an approximation that "[a distance between the opposite ends of the elastic element]×[a spring constant]∝[a force applied to the opposite ends of the elastic element]". In this connection, the distance between the opposite ends of the elastic element is equal to an integral value of the difference between the speed V of the slide 16 and the operating speed R of the servo-motor 14. Thus, if the spring constant of the die cushion mechanism 12 can be measured, the force applied to the opposite ends of the elastic element can be determined. The force applied to the opposite ends of the elastic element is the force F produced between the slide 16 and the cushion pad 26 (FIG. 2). Therefore, the force estimating section 52 can estimate the force F produced between the slide 16 and the cushion pad 26 (FIG. 2) by using the speed V of the slide 16, the operating speed R of the servo-motor 14 and the spring constant K.

As described above, the force estimated value H estimated by the force estimating section 52 is determined while depending on the operating speed R of the servo-motor 14, and thus shows lower accuracy but ensures a relatively short dead time until the force estimated value H is output. Therefore, similarly to the speed control loop L1 for the servo-motor 14 described above, the response in the second force control loop L1 using the force estimated value H is higher than that in the force control loop L2 using the force detected value D2. Thus, in the initial stage in which the rate of change in the force F is significant, the servo-motor 14 is controlled by using the first speed-command value E1 through the second force control loop L1 showing lower accuracy but ensuring higher response, and, in the succeeding stage in which the rate of change in the force F is insignificant, the servo-motor 14 is controlled by using the second speed-command value E2 through the typical or usual force control loop L2 showing lower response but ensuring higher accuracy. According to this control technique, characteristic effects equivalent to those of the control device 40 can be exhibited.

Figure 11:
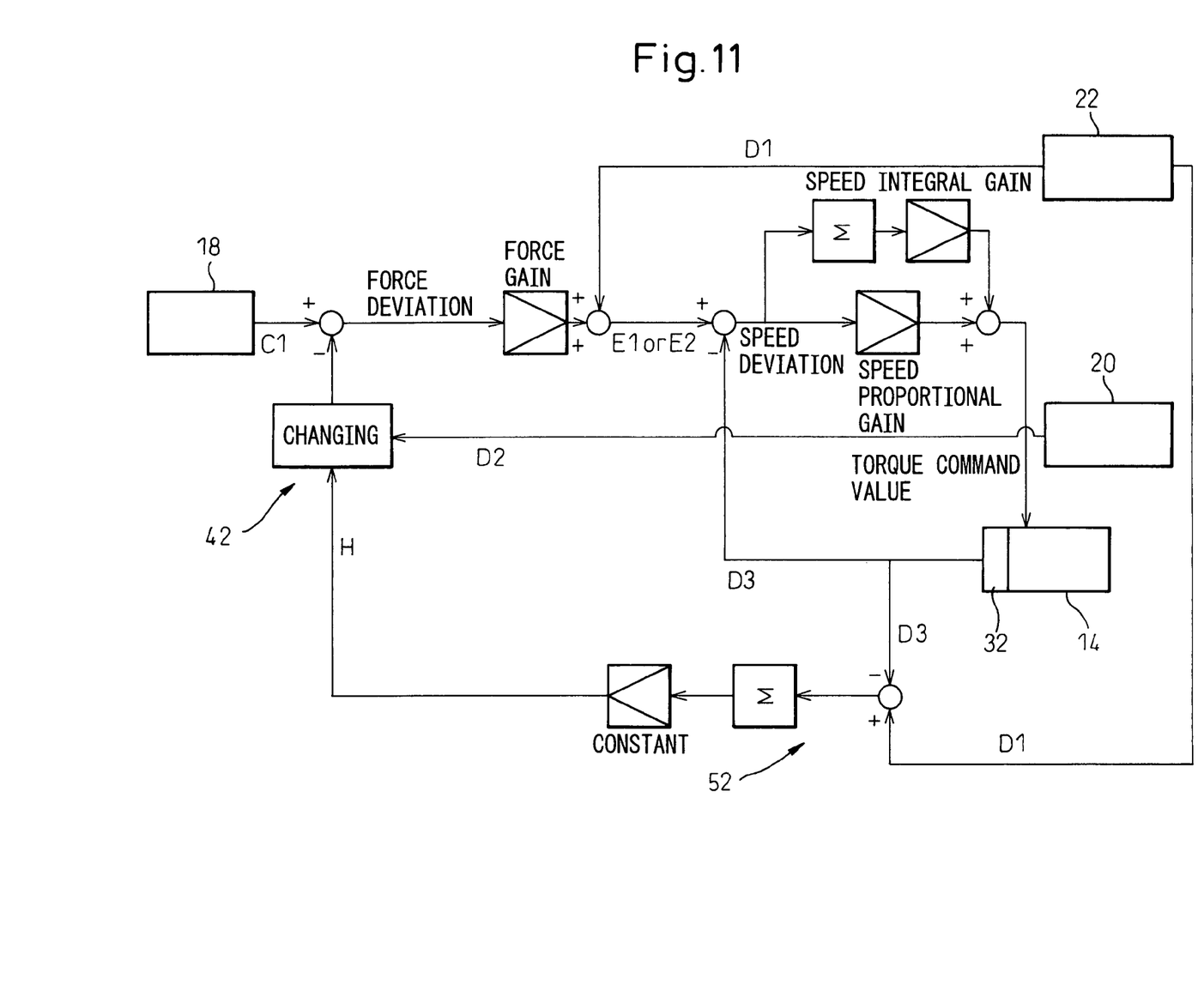
FIG. 11 is a block diagram showing a fourth control system implementing the control device of FIG. 10.

The configuration of the control device 50 described above can be implemented as a control system shown by a block diagram in FIG. 11. In the control system shown in FIG. 11, the force estimating section 52 uses the slide-speed detected value D1 detected by the slide-speed detecting section 22 and the motor-speed detected value D3 detected by the motor-speed detecting section 32, to estimate the force estimated value H.

Figure 12:
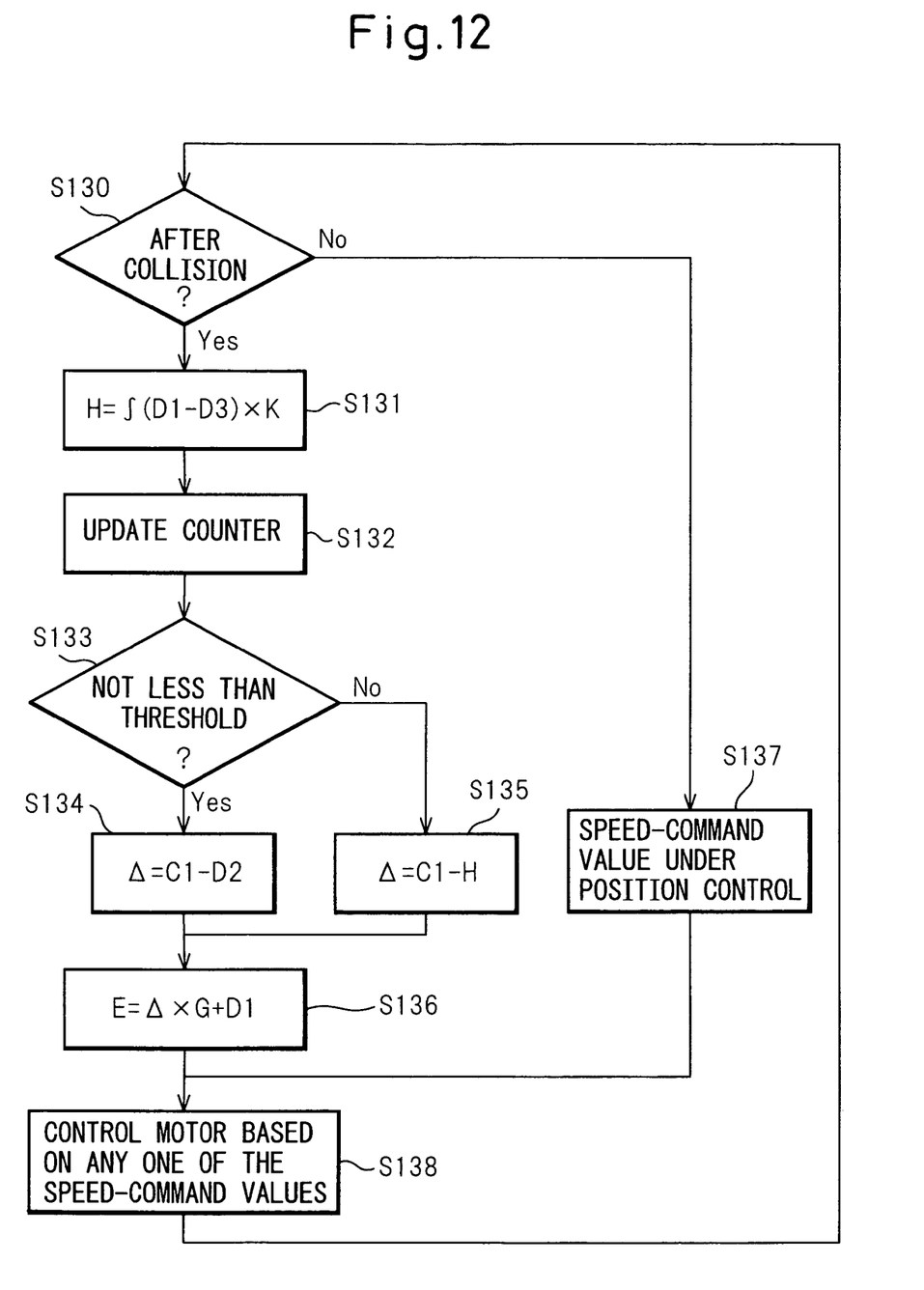
FIG. 12 is a control flow chart of the control system of FIG. 11.

The control system of FIG. 11 will be described in more detail, with reference to a force control flow shown in FIG. 12. First, it is judged, in step S130, whether the die cushion mechanism 12 produces the force F to be applied to the slide 16 (i.e., whether the slide 16 has collided with the die cushion mechanism 12). If the collision has already occurred, the force estimated value H is calculated, in step S131, by using the slide-speed detected value D1 and the motor-speed detected value D3, according to the following formula (4):

$$H = \int (D1-D3) \times K \quad (4)$$

Next, a counter (or a timer) is updated in step S132 and it is judged, in step S133, whether the counter is not less than a threshold (i.e., whether the process is either in the initial stage or in the succeeding stage). If the counter is not less than the threshold (i.e., the process is in the succeeding stage), the force deviation Δ is calculated from the force command value C1 and the force detected value D2, in step S134 (i.e., Δ=C1−D2).

On the other hand, if it is determined, in step S133, that the counter is less than the threshold (i.e., the process is in the initial stage), the force deviation Δ is calculated from the force command value C1 and the force estimated value H, in step S135 (i.e., Δ=C1−H). Then, the first speed-command value E1 and the second speed-command-value E2 (generally referred to as a speed-command value E) are calculated, in step S136, by using the force deviation Δ and the slide-speed detected value D1, according to the following formula (5), wherein G represents a force gain:

$$E = \Delta \times G + D1 \quad (5)$$

Further, if it is determined, in step 5130, that the slide 16 has not yet collided with the die cushion mechanism 12, the speed-command value under the position control is adopted, in step S137, as the speed-command value for the servo-motor 14. Then, in step S138, the servo-motor 14 is controlled, based on any one of the speed-command values determined so as to meet the respective situations described above.

While the invention has been described with reference to specific preferred embodiments, it will be understood, by those skilled in the art, that various changes and modifications may be made thereto without departing from the scope of the following claims.

The invention claimed is:

1. A device for controlling a die cushion mechanism including a servo-motor as a drive source and producing a force adapted to be applied to a slide in a press machine, comprising:
a force commanding section for commanding a force to be produced by said die cushion mechanism;
a force detecting section for detecting a force produced by said die cushion mechanism and applied to said slide;
a slide-speed detecting section for detecting a moving speed of said slide; and
a force controlling section for executing force controls in mutually different modes on said servo-motor, through mutually different control loops, one mode being provided for an initial stage defined from an instant when said die cushion mechanism starts producing said force to be applied to said slide until a predetermined subsequent instant, and another mode being provided for a succeeding stage defined after said predetermined subsequent instant, by using at least a slide-speed detected value detected by said slide-speed detecting section.

2. A device as set forth in claim 1, wherein said force controlling section comprises a speed-command preparing section for preparing a first speed-command value to be commanded to said servo-motor in said initial stage and a second speed-command value, different from said first speed-command value, to be commanded to said servo-motor in said succeeding stage.

3. A device as set forth in claim 2, wherein said speed-command preparing section uses, in said initial stage, exclusively said slide-speed detected value, to prepare said first speed-command value, and uses, in said succeeding stage, a force command value commanded by said force commanding section and a force detected value detected by said force detecting section in addition to said slide-speed detected value, to prepare said second speed-command value.

4. A device as set forth in claim 2, wherein said speed-command preparing section uses, in said initial stage, said slide-speed detected value, with a force deviation, given by a force command value commanded by said force commanding section and a force detected value detected by said force detecting section, being set to zero, to prepare said first speed-command value, and uses, in said succeeding stage, an actual value of said force deviation and said slide-speed detected value, to prepare said second speed-command value.

5. A device as set forth in claim 4, wherein said speed-command preparing section calculates said second speed-command value by adding said slide-speed detected value and a product of said force deviation multiplied by a proportional gain.

6. A device as set forth in claim 4, wherein said speed-command preparing section calculates said second speed-command value by summing up said slide-speed detected value, a product of said force deviation multiplied by a first force gain, and a product of an integral value of said force deviation multiplied by a second force gain.

7. A device as set forth in claim 2, wherein said speed-command preparing section uses, in said initial stage, said slide-speed detected value, with a force gain as multiplied by a force deviation, given by a force command value commanded by said force commanding section and a force detected value detected by said force detecting section, being set to zero, to prepare said first speed-command value, and uses, in said succeeding stage, said force deviation and said slide-speed detected value, with said force gain being set to a predetermined value other than zero, to prepare said second speed-command value.

8. A device as set forth in claim 7, wherein said force gain is a proportional gain; and wherein said speed-command preparing section calculates said second speed-command value by adding said slide-speed detected value and a product of said force deviation multiplied by said proportional gain.

9. A device as set forth in claim 7, wherein said force gain includes a first force gain and a second force gain; and wherein said speed-command preparing section calculates said second speed-command value by summing up said slide-speed detected value, a product of said force deviation multiplied by said first force gain, and a product of an integral value of said force deviation multiplied by said second force gain.

10. A device as set forth in claim 9, wherein said speed-command preparing section sets, in said initial stage, at least one of said first force gain and said second force gain to said zero.

11. A device as set forth in claim 2, further comprising a force estimating section for estimating a force produced by said die cushion mechanism and applied to said slide; wherein said speed-command preparing section uses, in said initial stage, a force command value commanded by said force commanding section and a force estimated value estimated by said force estimating section in addition to said slide-speed detected value, to prepare said first speed-command value, and uses, in said succeeding stage, a force command value commanded by said force commanding section and a force detected value detected by said force detecting section in addition to said slide-speed detected value, to prepare said second speed-command value.

12. A device as set forth in claim 11, further comprising a motor-speed detecting section for detecting an operating speed of said servo-motor; wherein said force estimating section uses a motor-speed detected value detected by said motor-speed detecting section and said slide-speed detected value, to estimate said force estimated value.

13. A die cushion mechanism incorporated into a press machine including a slide, comprising:
a cushion pad movable correspondingly to a motion of said slide;
a servo-motor for driving said cushion pad; and
a control device for controlling said servo-motor and producing a correlative pressure between said cushion pad and said slide;
wherein said control device comprises a control device as set forth in claim 1.

14. A method for controlling a die cushion mechanism including a servo-motor as a drive source and producing a force adapted to be applied to a slide in a press machine, comprising:
determining a force command value regarding a force to be produced by said die cushion mechanism;
determining a force detected value regarding a force produced by said die cushion mechanism and applied to said slide;
determining a moving-speed detected value regarding a moving speed of said slide; and
executing force controls in mutually different modes on said servo-motor, through mutually different control loops, one mode being provided for an initial stage defined from an instant when said die cushion mechanism starts producing said force to be applied to said slide until a predetermined subsequent instant, and another mode being provided for a succeeding stage defined after said predetermined subsequent instant, by using at least said moving-speed detected value regarding said moving speed of said slide.

15. A method as set forth in claim 14, wherein executing force controls comprises preparing a first speed-command value to be commanded to said servo-motor in said initial stage and preparing a second speed-command value, different from said first speed-command value, to be commanded to said servo-motor in said succeeding stage.

16. A method as set forth in claim 15, wherein, in said initial stage, said moving-speed detected value is exclusively used to prepare said first speed-command value, and, in said succeeding stage, said force command value and said force detected value are used in addition to said moving-speed detected value to prepare said second speed-command value.

17. A method as set forth in claim 15, wherein, in said initial stage, said moving-speed detected value is used, with a force deviation, given by said force command value and said force detected value, being set to zero, to prepare said first speed-command value, and, in said succeeding stage, an actual value of said force deviation and said moving-speed detected value are used to prepare said second speed-command value.

18. A method as set forth in claim 15, wherein, in said initial stage, said moving-speed detected value is used, with a force gain as multiplied by a force deviation, given by said force command value and said force detected value, being set to zero, to prepare said first speed-command value, and, in said succeeding stage, said force deviation and said moving-speed detected value are used, with said force gain being set to a predetermined value other than zero, to prepare said second speed-command value.

19. A method as set forth in claim 15, further comprising determining a force estimated value regarding a force produced by said die cushion mechanism and applied to said slide; wherein, in said initial stage, said force command value and said force estimated value are used in addition to said moving-speed detected value, to prepare said first speed-command value, and, in said succeeding stage, said force command value and said force detected value are used in addition to said moving-speed detected value, to prepare said second speed-command value.

* * * * *